United States Patent [19]

Jie et al.

[11] Patent Number: 5,465,314

[45] Date of Patent: Nov. 7, 1995

[54] METHOD OF MANUFACTURING OPTICAL CONNECTOR

[75] Inventors: Xu Jie, Ichihara; Kenji Suzuki, Chiba, both of Japan

[73] Assignee: The Furukawa Electronic Co., Ltd., Tokyo, Japan

[21] Appl. No.: 299,593

[22] Filed: Sep. 1, 1994

[30] Foreign Application Priority Data

Sep. 9, 1993 [JP] Japan .................................. 5-224213
Feb. 3, 1994 [JP] Japan .................................. 6-011717

[51] Int. Cl.$^6$ ..................................................... G02B 6/25
[52] U.S. Cl. ............................... 385/85; 385/76; 385/77; 385/78; 385/141; 51/307; 51/309
[58] Field of Search ................................ 385/76, 77, 78, 385/84, 85, 141, 134; 51/281 R, 283 R, 326, 293, 307, 308, 309

[56] References Cited

U.S. PATENT DOCUMENTS 4,099,832  7/1978  Warner, Jr. ........................... 385/64 X
4,654,051  3/1987  Orita et al. ............................ 51/298
4,918,872  4/1990  Sato et al. ............................ 51/209 R

FOREIGN PATENT DOCUMENTS

0535636A2  4/1993  European Pat. Off. ............. 385/85 X

*Primary Examiner*—Brian Healy
*Attorney, Agent, or Firm*—Frishauf, Holtz, Goodman, Langer & Chick

[57] ABSTRACT

This invention provides a method of manufacturing an optical connector including the steps of obtaining an optical connector having a fiber insertion hole, inserting an optical fiber into the fiber insertion hole of the optical connector such that the fiber end face of the optical fiber is exposed, and polishing the fiber end face of the optical fiber with a grindstone made by mixing cerium oxide abrasive grains and at least one type of abrasive grains selected from the group consisting of chromium oxide abrasive grains, zirconia abrasive grains, and alumina abrasive grains.

6 Claims, 2 Drawing Sheets

METHOD OF MANUFACTURING OPTICAL CONNECTOR

BACKGROUND OF THE INVENTION

1. Field of the Invention

The present invention relates to a method of manufacturing an optical connector for use in the field of optical communications.

2. Description of the Related Art

In connecting optical fibers, it is important to suppress increases in optical loss and reflection brought about by the connection. For this reason, in final polishing for the connecting end face of an optical connector, it is necessary to minimize damages, such as layers changed in properties by the processing or scratches, to the end face of a fiber. Therefore, regular final polishing makes use of a polishing method using a free abrasive, in which polishing is performed by spraying cerium oxide abrasive grains on a polisher which is a relatively soft tool.

In connecting optical connectors, on the other hand, a matching agent with a refractive index close to the refractive index of the core of an optical fiber is interposed between the connecting end faces of optical connectors, in order that no gap is formed between the end faces of optical fibers when the fibers are brought into contact with each other. This ensures the continuity of the refractive indices of the cores of the optical fibers, thereby suppressing the optical loss and the reflection.

In the polishing method using a free abrasive, however, variations are caused in the amount of polishing at the connector end faces or the flatness of the connecting end face of an optical connector decreases due to the difference in hardness between the material of the ferrule of an optical connector and the material of an optical fiber or due to the softness of a polisher. In addition, the efficiency of polishing is very low in this method.

Also, if a matching agent is interposed between the connecting end faces of optical connectors in connecting the optical connectors, the amount of the matching agent decreases with time owing to, e.g., evaporation. This degrades the long-term reliability of the effect of suppressing an optical loss and reflection. When this is taken into consideration, it is necessary to be able to make a PC (Physical Contact) connection between optical fibers themselves.

SUMMARY OF THE INVENTION

The present invention has been made in consideration of the above situations and has as its object to provide a method of manufacturing an optical connector having a connecting end face with a high flatness and capable of performing a good PC connection when connected.

The present invention provides a method of manufacturing an optical connector, comprising the steps of obtaining an optical connector having a fiber insertion hole, inserting an optical fiber into the fiber insertion hole of the optical connector such that the fiber end face of the optical fiber is exposed, and polishing the fiber end face of the optical fiber with a grindstone made by mixing cerium oxide abrasive grains and at least one type of abrasive grains selected from the group consisting of chromium oxide abrasive grains, zirconia abrasive grains, and alumina abrasive grains. 10

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1:
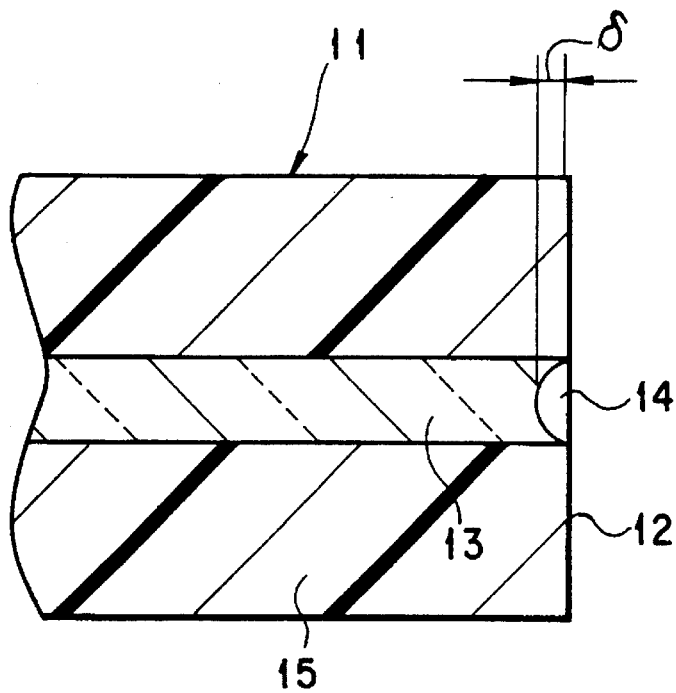
FIG. 1 is a sectional view for explaining the mechanochemical effect which a grindstone made of cerium oxide abrasive grains has on an optical connector.

The present invention is characterized by polishing the end face of a fiber with a grindstone made by mixing cerium oxide abrasive grains and at least one type of abrasive grains selected from the group consisting of chromium oxide abrasive grains, zirconia abrasive grains, and alumina abrasive grains.

A grindstone made of cerium oxide abrasive grains has a mechanochemical effect on optical fibers and can therefore polish the end face of an optical fiber without forming layers changed in properties by the processing or scratches. The mechanochemical effect of cerium oxide is conspicuous particularly with respect to quartz-based optical fibers. Therefore, this strong mechanochemical effect forms a depression in the end face of a fiber if cerium oxide alone is used. The mechanochemical effect of cerium oxide can be suppressed to a minimum necessary degree by enhancing the physical polishing action by mixing a predetermined amount of any of chromium oxide abrasive grains, zirconia abrasive grains, and alumina abrasive grains in cerium oxide abrasive grains, as in the present invention. This consequently improves the polishing efficiency while preventing a depression in a fiber end face after the polishing, allowing the fiber end face to be mirror-polished. Also, unlike in a polishing process using a free abrasive, the flatness of the connecting end face of an optical connector after the polishing is exceedingly high.

In the present invention, it is desirable that the maximum grain size of cerium oxide abrasive grains be set to 10 µm or smaller. This is so because, if the maximum grain size of abrasive grains exceeds 10 µm, it becomes difficult to obtain a high-quality mirror surface free from defects or scratches. It is also preferable that the maximum grain size of chromium oxide abrasive grains, zirconia abrasive grains, and alumina abrasive grains be set to 6 µm or smaller. This is because scratches are readily formed if the maximum grain size of abrasive grains to be mixed in cerium oxide exceeds 6 µm.

The purity of cerium oxide for use in cerium oxide abrasive grains is normally about 50%. When cerium oxide with this purity is to be used as cerium oxide abrasive grains, the ratio of the cerium oxide abrasive grains with respect to the total amount of abrasive grains serving as a grindstone is preferably 40 to 70 vol % for the reasons explained below. That is, if the ratio of the cerium oxide abrasive grains is smaller than 40 vol %, the problem of scratches or layers changed in properties by the processing is introduced. On the other hand, if the ratio is greater than 70 vol %, the end face of an optical fiber polished forms a depression due to the mechanochemical effect. More specifically, if the other abrasive grains to be mixed are chromium oxide abrasive grains, the ratio of the cerium oxide abrasive grains with respect to the total amount of abrasive grains is 40 to 60 vol %; if the other abrasive grains are zirconia abrasive grains, the ratio is 40 to 60 vol %; if the other abrasive grains are alumina abrasive grains, the ratio is 50 to 70 vol %. Note that as the purity of cerium oxide is higher, it is necessary to decrease the ratio of cerium oxide abrasive grains accordingly.

As a binder for firmly supporting the abrasive grains, a resin, e.g., a phenolic resin is used in an amount of 3 wt % or less with respect to the total weight of the grindstone. Therefore, 97 wt % or more with respect to the total weight of the grindstone are accounted for by the abrasive grains, and the binding force obtained by the binder is weak. Accordingly, the abrasive grains easily come off from the grindstone, this grindstone has self-dressing effect, and the number of abrasive grains contributing to the polishing is large. As a result, the polishing efficiency is high, and damages (defects such as scratches) to the polished end face of an object to be polished can be reduced.

On the other hand, since the binding force between the abrasive grains is weak, the grindstone easily brakes. Under these circumstances, to stabilize the polishing quality in a polishing process, it is desirable to perform tooling for a grindstone during polishing or each time polishing is performed. The tooling is to automatically perform correction for the flatness of the end face of a grindstone. That is, to finish optical connectors well and to improve the flatness accuracy of the end faces of optical connectors, the tooling keeps the flatness accuracy of a grindstone on the order of microns at any instant. Note that the polishing process defined in the present invention is performed as final polishing.

An embodiment of the present invention will be described in detail below with reference to the accompanying drawings.

FIG. 1 is a view for explaining the mechanochemical effect which a grindstone constructed from cerium oxide abrasive grains has on an optical connector 11 constituted by an optical fiber 13 which is 125 µm in diameter and a connector ferrule 15. When polishing is performed for a connecting end face 12 of the optical connector 11 by using a grindstone made of cerium oxide abrasive grains (purity= about 50%) alone, a fiber end face 14 of the optical fiber 13 assumes a depressed shape. The maximum depression amount at this time is represented by $\delta$.

Figure 2:
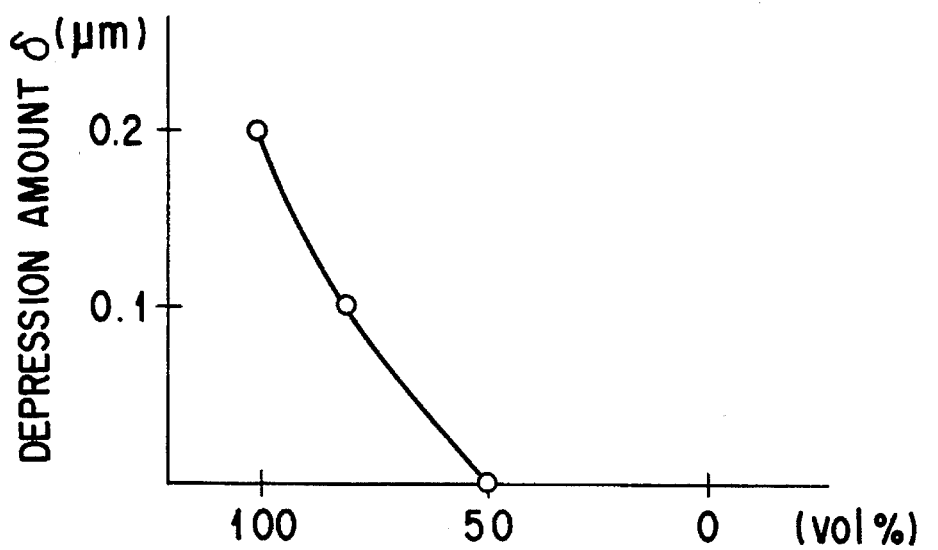
FIG. 2 is a graph showing the relationship between the ratio of cerium oxide abrasive grains in grindstone made of an abrasive grain mixture of cerium oxide abrasive grains and zirconia abrasive grains and the depression amount $\delta$ of a fiber end face.

FIG. 2 is a graph showing the relationship between the ratio of cerium oxide abrasive grains and the depression amount $\delta$ of the fiber end face when final polishing is performed for the connecting end face of an optical connector by using a grindstone composed of an abrasive grain mixture of cerium oxide abrasive grains (purity=about 50%) and zirconia abrasive grains. The depression amount $\delta$ of the fiber end face was obtained by measuring the central portion of the fiber end face by using a surface roughness meter.

As can be seen from FIG. 2, when the ratio of cerium oxide was 100 vol %, the depression amount $\delta$ in the center of the fiber reached approximately 0.2 µm, a very large value. In contrast, the depression amount $\delta$ was 0 when the ratio of cerium oxide was 50 vol %. In the polishing process of the present invention, the ratio of cerium oxide abrasive grains is desirably as high as possible in order to minimize formation of layers changed in properties by the processing or scratches. However, FIG. 2 reveals that the ratio of cerium oxide is preferably about 50 vol % in order to minimize the depression amount $\delta$ of the fiber end face. Note that, when chromium oxide abrasive grains or alumina abrasive grains are used as the abrasive grains to be mixed in cerium oxide, a mixing ratio for such abrasive grains is present at which formation of layers changed in properties by the processing or scratches is minimized and therefore the depression amount $\delta$ can be minimized, as in the above case.

One experiment conducted to confirm the effect of the present invention will be described below.

First, connector ferrules each having fiber insertion holes and made of epoxy-resin containing a glass filler were prepared. An optical fiber was inserted into each fiber insertion hole of each connector ferrule. Thereafter, an adhesive was coated between the optical fiber and the fiber insertion hole and hardened with heat in this state.

Subsequently, the optical fiber projecting from the connecting end face of the connector ferrule and the adhesive overflowing to the end face were removed by grinding, and preprocessing was performed by using a grindstone such as a #3000 diamond grindstone. Thereafter, final polishing was performed for the connecting end face of each connector ferrule under the polishing conditions as in Table 1 below by using a grindstone (as a binder of the grindstone, 3 wt % or less of a phenolic resin with respect to the total weight of the grindstone were added. The grindstone had a Mohs hardness of about 1) made from an abrasive grain mixture of 50 vol % of cerium oxide abrasive grains (purity= about 50%) whose maximum grain size was 10 µm and 50 vol % of zirconia abrasive grains (purity=85% or more) whose maximum grain size was 4 µm. During this polishing process, tooling was performed for the grindstone. In this fashion, optical connectors were manufactured.

TABLE 1

| | Polishing Conditions |
|---|---|
| Polishing scheme | Constant-pressure lapping scheme using grinding wheel as bonded abrasive |
| Polishing pressure | about 2.5 kgf/cm$^2$ |
| Polishing rate | about 500 m/min |
| Polishing time | 30 sec |
| Polishing liquid | Water |

Figure 3:
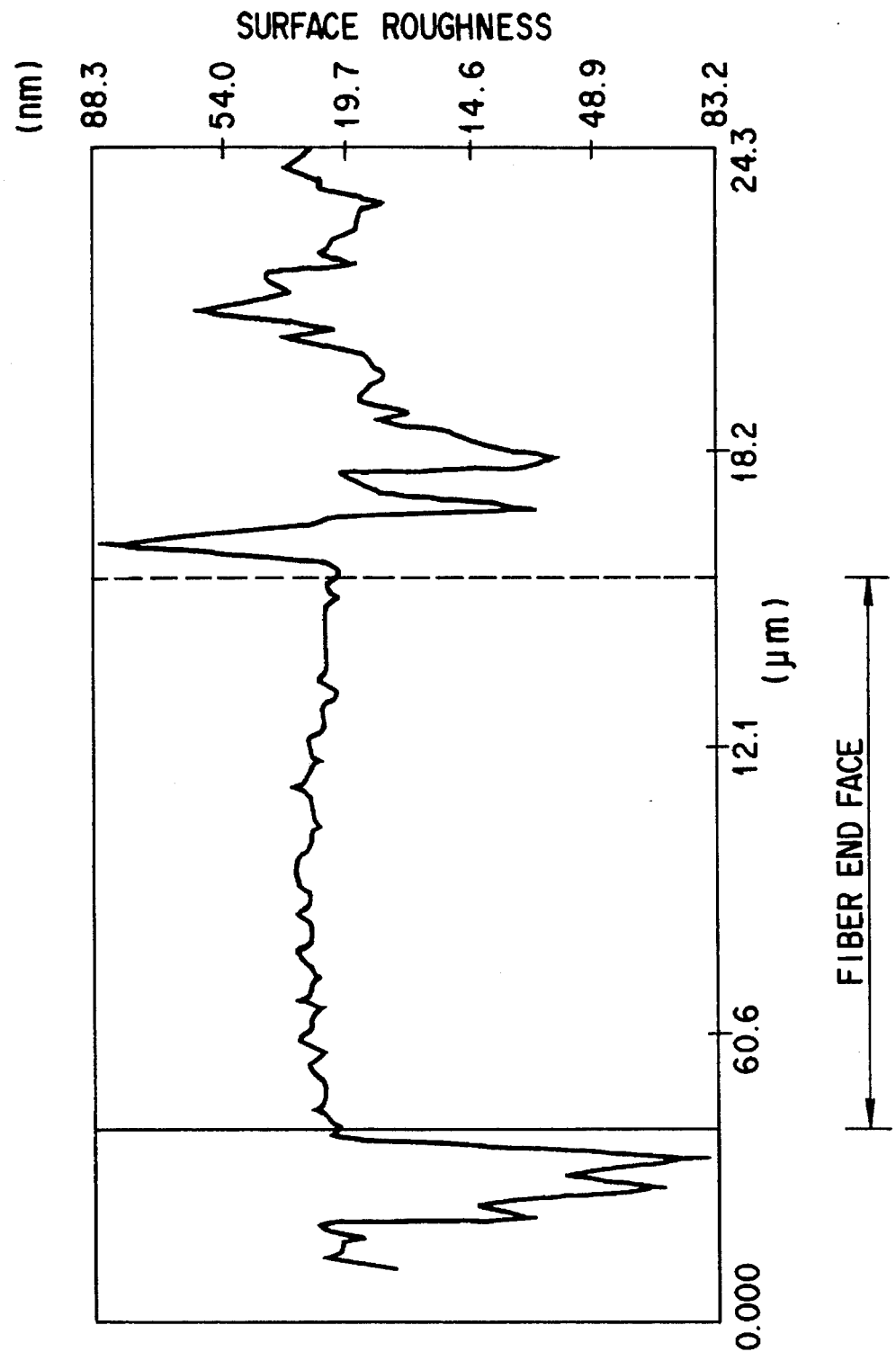
FIG. 3 is a graph showing the surface roughness of the fiber end face of an optical connector obtained by the method of the present invention.

The surface roughness of a region including the fiber end face of each resultant optical connector was measured with a surface roughness meter. The result is shown in FIG. 3. As is apparent from FIG. 3, the surface roughness in the fiber end face region was ten-odd nm. In addition, the flatness of that region was exceedingly high, and no depression was found in the fiber end face. Also, no scratches were found even under microscopic observation.

As discussed above, the optical connector obtained by the method of the present invention was mirror-polished very well owing to the mechanochemical effect. Additionally, two optical fibers were connected by bringing the fiber end faces into contact with each other, and the optical transmission characteristics were examined. Consequently, the connection loss was 0.4 dB, indicating that a good PC connection was formed.

In this experiment, the grindstone made of an abrasive grain mixture of 50 vol % of cerium oxide abrasive grains (purity=about 50%) and 50 vol % of zirconia abrasive grains (purity=85% or more) was used. However, it was also confirmed that nearly identical effects were obtained by using an abrasive grain mixture of 50 vol % of cerium oxide abrasive grains (purity=about 50%) and 50 vol % of chromium oxide abrasive grains (purity=about 99%), or an abrasive grain mixture of 60 vol % of cerium oxide abrasive grains (purity=about 50%) and 40 vol % of alumina abrasive grains (purity=about 99%), instead of the abrasive grain mixture of the above experiment. In the above embodiment, the amount of abrasive grains with respect to the total weight of the grindstone is 97 wt % or more, and a binder is added in an amount of only 3 wt % or less with respect to the total amount of the grindstone. Therefore, since the binding force between the abrasive grains is weak. Therefore, since a lot of abrasive grains contribute to polishing, a high polishing efficiency can be achieved, and polishing can be attained without causing damages such as scratches to the optical connector end face. Since the abrasive grains is fell from the grindstone easily, the clogging of the grindstone does not occur.

The present invention is applicable to either a single-core optical connector or a multi-core optical connector. The present invention is also applicable to an optical connector using a connector ferrule made of a material different from the material of the connector ferrule used in the above embodiment.

In the optical connector manufacturing method of the present invention as has been discussed above, an optical fiber is inserted into a fiber insertion hole of an optical connector such that the end face of the fiber is exposed, and this fiber end face is polished with a grindstone (containing 3 wt % or less of a binder with respect to the total weight of the grindstone) made by mixing cerium oxide abrasive grains and at least one type of abrasive grains selected from the group consisting of chromium oxide abrasive grains, zirconia abrasive grains, and alumina abrasive grains. Therefore, it is possible to obtain an optical connector in which the flatness of the connecting end face is high after the final polishing and the fiber end face does not assume a depressed shape, while increasing the efficiency of the final polishing. Also, the optical connector obtained by the method of the present invention can perform a good PC connection.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of manufacturing an optical connector comprising the steps of:

providing an optical connector having at least one fiber insertion hole;

inserting an optical fiber into said at least one fiber insertion hole of said optical connector such that a fiber end face of said optical fiber is exposed; and polishing said fiber end face of said optical fiber with a grindstone made by mixing cerium oxide abrasive grains and zirconia abrasive grains, wherein:

a maximum grain size of said cerium oxide abrasive grains is not more than 10 μm, a maximum grain size of said zirconia abrasive grains is not more than 6 μm, said cerium oxide abrasive grains contain 20 to 30% by volume of cerium oxide based on a total amount of said grindstone, and said grindstone contains not more than 3% by weight of a resin binder with respect to a weight of said grindstone.

2. The method according to claim 1, wherein said cerium oxide abrasive grains have about 50% of cerium oxide purity and constitute 40 to 60% by volume of a total amount of said grindstone.

3. A method of manufacturing an optical connector, comprising the steps of:

providing an optical connector having at least one fiber insertion hole;

inserting an optical fiber into said at least one fiber insertion hole of said optical connector such that a fiber end face of said optical fiber is exposed; and polishing said fiber end face of said optical fiber with a grindstone made by mixing cerium oxide abrasive grains and chromium oxide abrasive grains, wherein:

a maximum grain size of said cerium oxide abrasive grains is not more than 10 μm, a maximum grain size of said chromium oxide abrasive grains is not more than 6 μm, said cerium oxide abrasive grains contain 20 to 30% by volume of cerium oxide based on a total amount of said grindstone, and said grindstone contains not more than 3% by weight of a resin binder with respect to a weight of said grindstone.

4. The method according to claim 3, wherein said cerium oxide abrasive grains have about 50% of cerium oxide purity and constitute 40 to 60% by volume of a total amount of said grindstone.

5. A method of manufacturing an optical connector, comprising the steps of:

providing an optical connector having at least one fiber insertion hole;

inserting an optical fiber into said at least one fiber insertion hole of said optical connector such that a fiber end face of said optical fiber is exposed; and polishing said fiber end face of said optical fiber with a grindstone made by mixing cerium oxide abrasive grains and alumina abrasive grains, wherein:

a maximum grain size of said cerium oxide abrasive grains is not more than 10 μm, a maximum grain size of said alumina abrasive grains is not more than 6 μm, said cerium oxide abrasive grains contain 25 to 35% by volume of cerium oxide based on a total amount of said grindstone, and said grindstone contains not more than 3% by weight of a resin binder with respect to a weight of said grindstone.

6. The method according to claim 5, wherein said cerium oxide abrasive grains have about 50% of cerium oxide purity and constitute 50 to 70% by volume of a total amount of said grindstone.

* * * * *